Dec. 15, 1931. J. HERBECK 1,836,663
AEROPLANE
Filed June 26, 1930 2 Sheets-Sheet 1

Inventor
J. Herbeck

Dec. 15, 1931.  J. HERBECK  1,836,663
AEROPLANE
Filed June 26, 1930   2 Sheets-Sheet 2
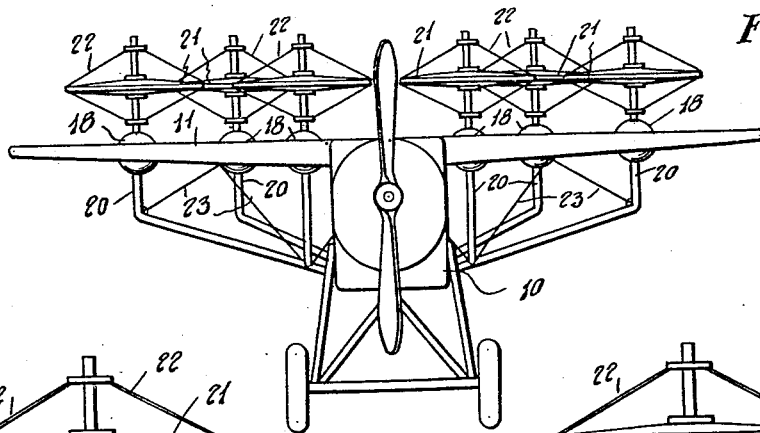
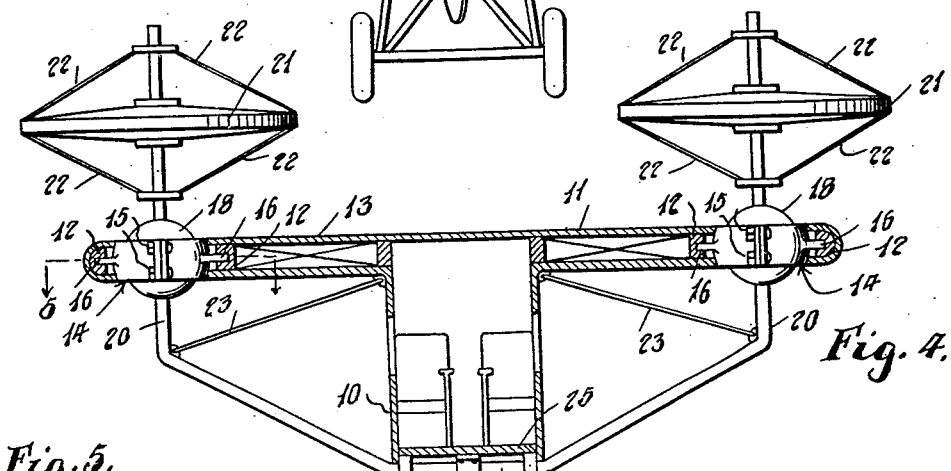
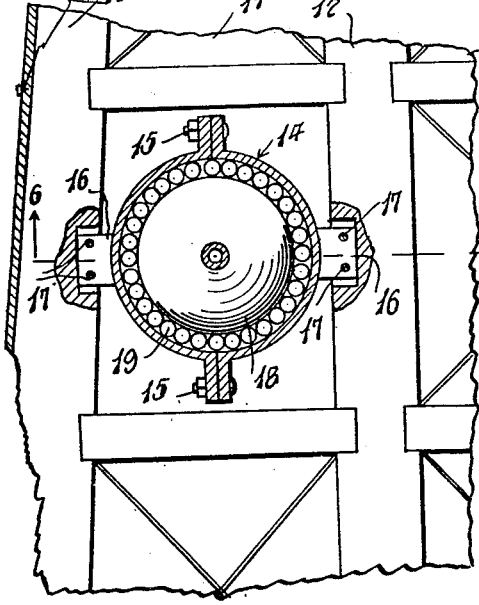
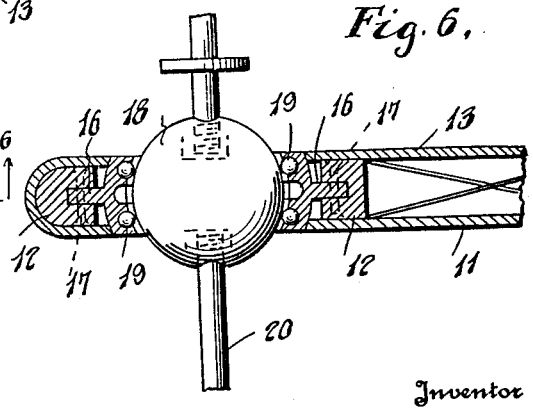
Inventor
J. Herbeck.

Patented Dec. 15, 1931

1,836,663

UNITED STATES PATENT OFFICE

JOSEPH HERBECK, OF LOS ANGELES, CALIFORNIA

AEROPLANE

Application filed June 26, 1930. Serial No. 463,992.

This invention relates to an aeroplane and it aims to provide a novel automatically operating stabilizing means.

It is particularly aimed to provide a construction wherein there is a tendency for the main wing or wings of the aeroplane to remain in and seek a horizontal position at all times not only to stabilize the aeroplane during flight but in case of accident, to enable the aeroplane to descend in a manner simulating a parachute.

A further object is to provide a construction wherein a multiplicity of auxiliary planes have universal connection with the main plane and fuselage in such manner that there is relative yielding movement between them and the fuselage or body of the aeroplane itself, may serve as the stabilizing weight for the multiplicity of auxiliary planes or the like.

The more specific objects and advantages will become apparent from a consideration of the description following taken in connection with accompanying drawings illustrating an operative embodiment.

In said drawings:—

Figure 3 is a front elevation thereof,

Figure 4 is a cross sectional view taken on the line 4—4 of Figure 1,

Figure 5 is a cross sectional view taken on the line 5—5 of Figure 4,

Figure 6 is a cross sectional view taken on the line 6—6 of Figure 5, and

Figure 1:
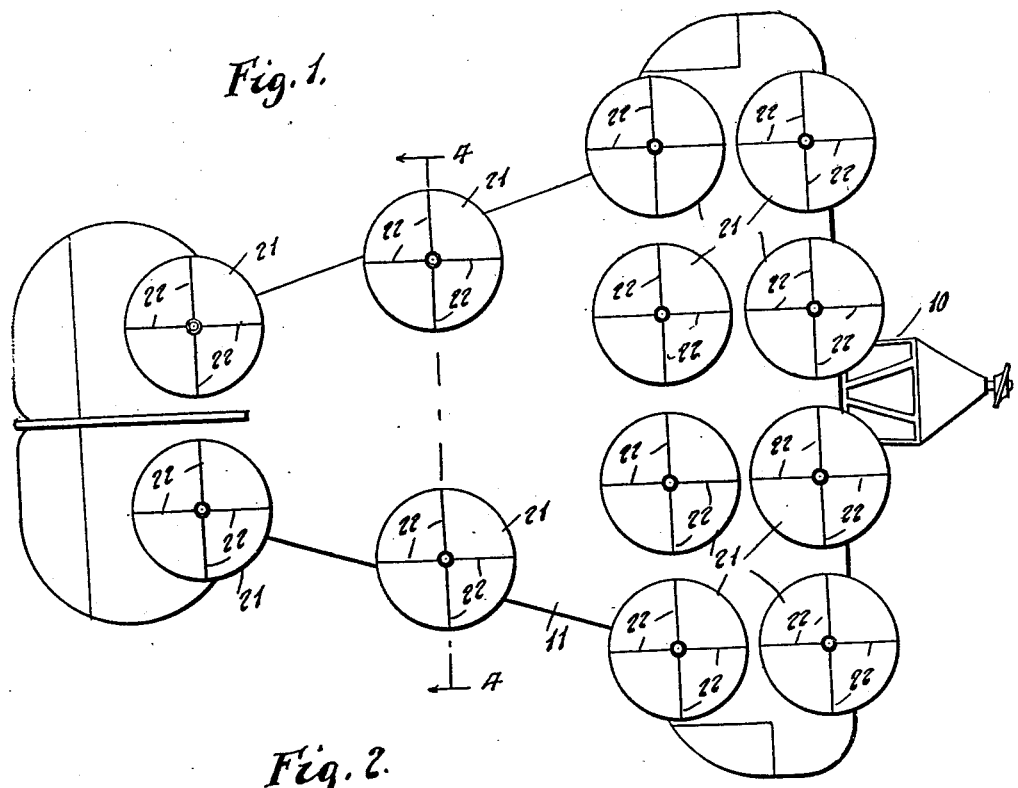
Figure 1 is a plan view of the improved aeroplane.
Figure 2:
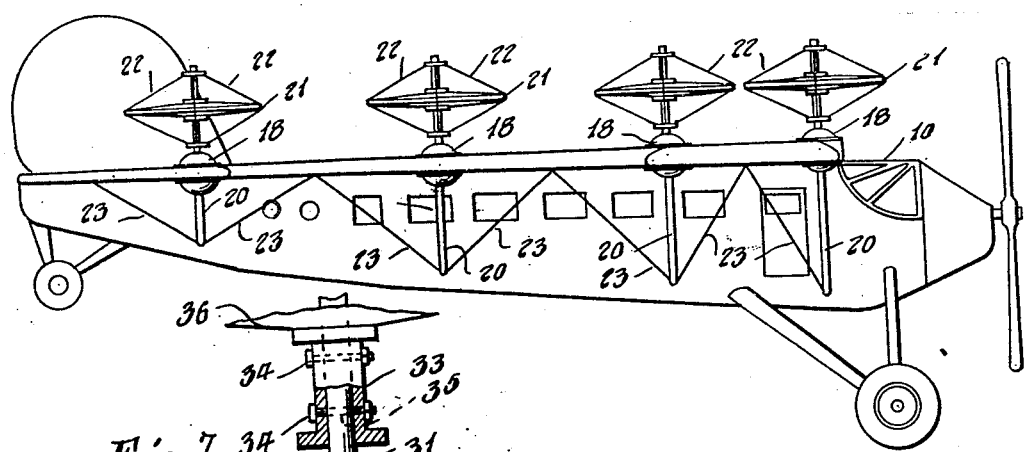
Figure 2 is a side elevation thereof.

Referring specifically to the drawings, the aeroplane has a conventional fuselage as at 10 and a main supporting wing at 11 extending equi-distantly on opposite sides of the fuselage and primarily being flexible and composite like existing aeroplane wings to which end it has a skeleton frame 12 of wood or the like and a fabric or equivalent covering 13.

Annular bearing rings 14 are carried by the plane or wing 11. Such rings are sectional, preferably being in two parts secured together by bolts as at 15 and each section having a securing lug 16 which is mortised into adjacent portions of the frame 12 and secured therein by bolts or rivets as at 17. The rings are arcuate transversely and mount balls 18 therein, ball bearings 19 preferably being interposed in order to reduce friction and being carried by the bearing rings 14.

Rigid with the balls 18 are rods 20 which extend above and below the balls and above the same rigidly carry disks or the like 21 which provide supporting surfaces or form auxiliary planes. Such disks 21 may be composite and thus be made up, like the wing 11, of a wooden frame and fabric or equivalent covering. Such members 21 are effectively braced by guy wires 22 connected thereto and to the rods. Such rods 20 are also braced by guy wires 23 connected thereto and to the wings or fuselage, as at the junctions thereof as shown in the drawings.

The rods 20 are generally of U-shape so that they may mount at opposite ends balls 18 and disks 21 and pass at an intermediate portion 24 through the fuselage preferably below the floor 25 thereof and be journaled in bearings 26 located within such fuselage.

As a result of the construction described, the members 18 need not necessarily be of great weight or even be considered as weights. During operation of the aeroplane, there will be relative movement between the wing 11 and the balls 18 and the connection of the parts is such that the fuselage and wing 11 or the aeroplane as a whole, constitutes a weight for the stabilizing or auxiliary planes or disks 21 causing the wing 11 to always remain in or seek a horizontal position.

It will be noted that a multiplicity of stabilizing disks or auxiliary planes 21 are provided and that they may be arranged wherever desired over the wing or supporting surface of the plane, the same even extending to the tail thereof as shown in Figure 1 if desired.

Figure 7:
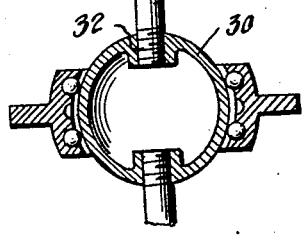
Figure 7 is a view substantially similar to Figure 6 but through a slightly modified form.

If preferred, means may be provided whereby the height or elevation of the stabilizing planes 21 may be varied. In this connection, an example is given in Figure 7. The ball there shown is designated 30 and is the same as that at 18. A rod portion 31 is screw threaded thereto as at 32 and adjustably mounted thereon is a spool 33. Bolts 34 detachably secure the spool to the rod portion 31 by passing through holes 35 in the bolts. The spool carries a stabilizing plane 36 which is similar or equivalent to that at 21. It will be seen that the bolts 34 may be provided in any of the series of holes 35 and thus arranged for varying the elevation of the stabilizing member 36.

Various changes may be resorted to provided they fall within the spirit and scope of the invention.

I claim as my invention:—

1. In an aeroplane, a fuselage, a supporting wing therefor, auxiliary planes, means connecting the auxiliary planes to the fuselage, said means including ball and socket connections with the wing.

2. In an aeroplane, a fuselage, a supporting wing therefor, stabilizing members on opposite sides of the fuselage, and means common to and connecting said stabilizing members to the fuselage and for movement relatively to the wing.

3. In an aeroplane, a fuselage, a wing, bearings carried by the wing, balls journaled in the bearings, rods extending above and below the balls, means journaling the rods on the fuselage, and stabilizers carried by the rods above the balls.

4. In an aeroplane, a fuselage, a wing, bearings carried by the wing, balls journaled in the bearings, rods extending above and below the balls, means journaling the rods on the fuselage, and stabilizers carried by the rods above the balls, each rod being substantially of U-shape whereby it carries a plurality of stabilizers, the intermediate portions of such U-shaped rods being journaled on the fuselage.

5. In an aeroplane, a fuselage, a supporting wing therefor, and a multiplicity of stabilizers coacting with and movable relatively to said wing and located on opposite sides of the fuselage to normally maintain the same in and cause it to seek a horizontal position, and means journalled on the fuselage, common to and connecting said stabilizer.

In testimony whereof I affix my signature.

JOSEPH HERBECK.